(12) United States Patent
Collins et al.

(10) Patent No.: US 6,791,990 B1
(45) Date of Patent: Sep. 14, 2004

(54) PRIORITY SELECTION MEANS FOR DATA TRANSMISSION APPARATUS

(75) Inventors: Michael Patrick Robert Collins, Manchester (GB); Alexander David Baker, Manchester (GB)

(73) Assignee: Xyratex Technology Limited, Hampshire (GB)

( * ) Notice: Subject to any disclaimer, the term of this patent is extended or adjusted under 35 U.S.C. 154(b) by 0 days.

(21) Appl. No.: 09/485,109

(22) PCT Filed: Aug. 14, 1998

(86) PCT No.: PCT/GB98/02450
§ 371 (c)(1),
(2), (4) Date: Jun. 12, 2000

(87) PCT Pub. No.: WO99/14916
PCT Pub. Date: Mar. 25, 1999

(30) Foreign Application Priority Data

Sep. 12, 1997 (GB) .............................................. 9719316

(51) Int. Cl.[7] .............................................. H04L 12/28
(52) U.S. Cl. ..................................................... 370/412
(58) Field of Search ................................ 370/412, 235, 370/413, 414, 415, 416, 417, 418, 429, 375–379

(56) References Cited

U.S. PATENT DOCUMENTS

| | | | | |
|---|---|---|---|---|
| 4,922,485 A | * | 5/1990 | Quinquis et al. | ........... 370/418 |
| 5,229,992 A | * | 7/1993 | Jurkevich et al. | |
| 5,278,828 A | | 1/1994 | Chao | ........................ 370/85.6 |
| 5,390,176 A | | 2/1995 | Schoute et al. | ............ 370/60.1 |
| 5,412,665 A | | 5/1995 | Gruodis et al. | ................ 371/27 |
| 5,553,061 A | | 9/1996 | Waggener, Jr. et al. | ........ 370/17 |
| 5,689,500 A | * | 11/1997 | Chiussi et al. | |
| 5,696,764 A | * | 12/1997 | Soumiya et al. | ....... 370/395.41 |
| 5,754,540 A | * | 5/1998 | Liu et al. | |
| 5,764,641 A | * | 6/1998 | Lin | |
| 6,018,527 A | * | 1/2000 | Yin et al. | |
| 6,456,593 B1 | * | 9/2002 | Iverson et al. | |
| 6,490,248 B1 | * | 12/2002 | Shimojo | |

FOREIGN PATENT DOCUMENTS

WO          9845973          10/1998

OTHER PUBLICATIONS

"An Adaptive Threshold Based Scheduling Policy for ATM Networks" by Banawan et al. Proc. Of the 1996 IEEE 15th Ann. Int'l. Phoenix Conference on Computer Communications, Mar. 27–29, 1996; Conf. No. 15, pp. 439–445.

* cited by examiner

Primary Examiner—Frank Duong
(74) Attorney, Agent, or Firm—Pillsbury Winthrop LLP

(57) ABSTRACT

A priority selector includes buffers receiving control information relating to data to be transmitted through a data switching apparatus (each buffer is arranged to store control information having a respective one of a predetermined number of priority levels and arranged to deliver an overflow signal when contents reach a first predetermined level), storage storing digital priority symbols representative of different priority levels denoted by control information received by the buffers, a random number generator generating a succession of numbers each of which selects a corresponding priority symbol from the storage, a gate responsive to the receipt of the overflow signal from any one of the buffers to change the priority symbol generated by the storage to that designating the buffer giving rise to the overflow signal to change the priority symbol generated by the storage, and a selector responsive to the gate output to select a buffer output.

6 Claims, 1 Drawing Sheet

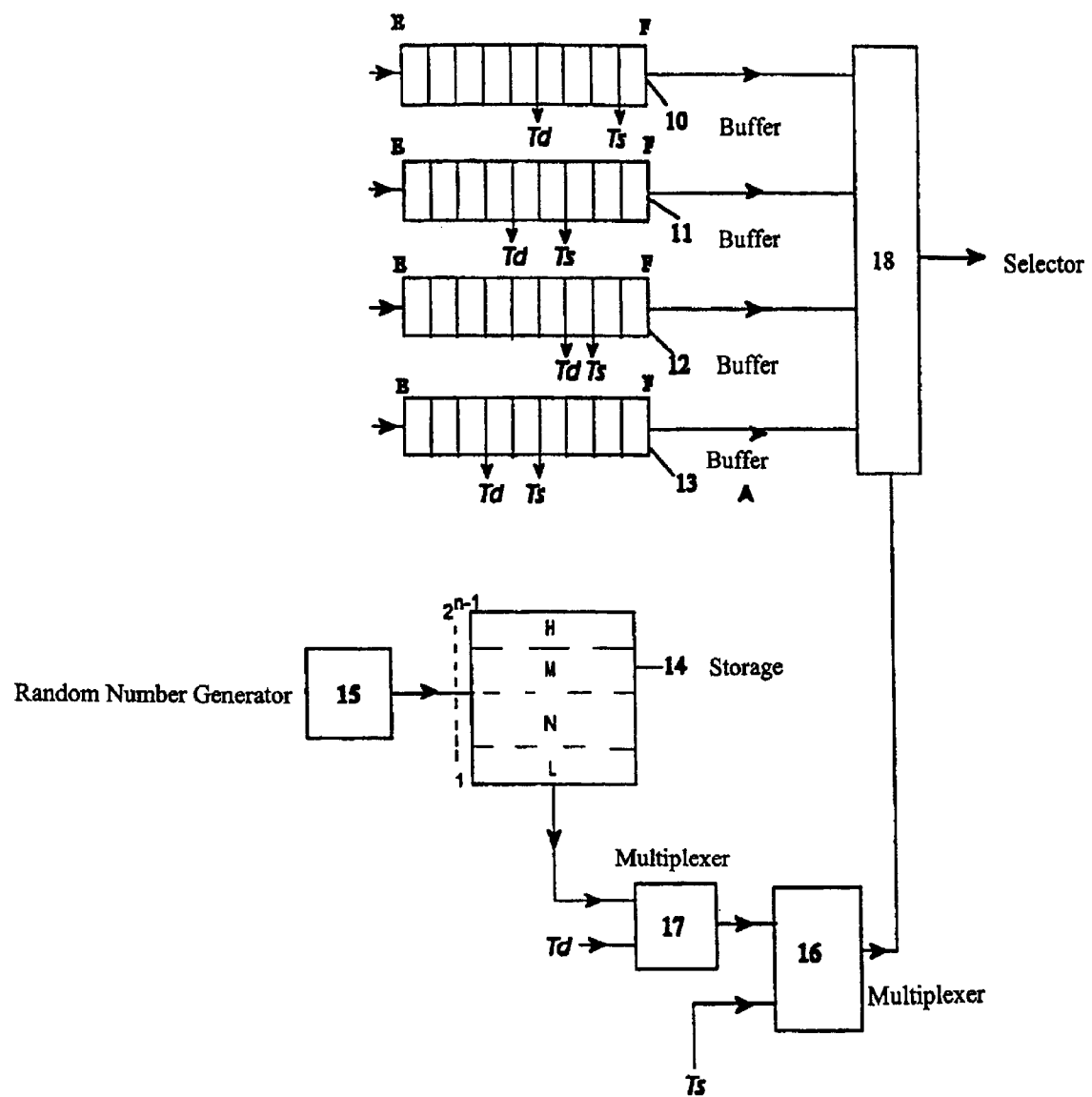

US 6,791,990 B1

PRIORITY SELECTION MEANS FOR DATA TRANSMISSION APPARATUS

BACKGROUND OF THE INVENTION

1. Field of the Invention

This invention relates to priority selection means for data switching apparatus for use in computer-controlled digital data transmission systems.

2. Description of the Related Art

Many types of data transmission apparatus are known, all having their own particular features and systems. In all cases the intention is to allow data switching and transmission to be achieved as rapidly as the apparatus will allow. It is common for data to be sent in "packets" consisting of a predetermined number of bits of data plus control information indicating certain parameters about the data or its mode of transmission. One of the parameters often defined is the priority of that particular packet, that is the precedence which it should be given over other packets of data awaiting transmission. Apparatus for ensuring that, wherever possible, such a priority indication is observed may conveniently be referred to as priority selection means, and this term is used throughout this specification.

SUMMARY OF THE INVENTION

It is an object of the invention to provide priority selection means for data transmission apparatus operable to ensure that, over a period of time, data is transmitted with the precedence indicated by the priority level contained in its associated control information, independent of any other parameters to be observed.

According to the present invention there is provided priority selection means for digital data transmission apparatus, which means includes buffer means operable to receive control information relating to data to be transmitted through the data transmission apparatus, the buffer means comprising a separate buffer arranged to store control information having each of a predetermined number of priority levels and each buffer being arranged to deliver an override signal when its contents reach a predetermined level, storage means operable to store digital priority symbols representative of the different priority levels denoted by control information received by the buffer means, a random number generator operable to generate a succession of numbers each of which produces a corresponding priority symbol from the storage means, gating means responsive to the receipt of the override signal from one of the buffers to change the priority symbol generated by the storage means, and selector means responsive to the output of the gating means to select an output from that buffer designated by that output.

The priority selection means may, for example, be used with the data switching apparatus described and claimed in our co-pending British patent application No. 971742.2.

BRIEF DESCRIPTION OF THE DRAWINGS

The invention will now be described with reference to the accompanying drawing, which shows a schematic block diagram of one form of priority selection means according to an embodiment of the invention.

DETAILED DESCRIPTION OF THE INVENTION

For the purposes of the following description some basic assumptions have been made. It is assumed, by way of example, that data to be passed through the switching apparatus has been given one of four priority levels by its originator. These priority levels may be called High, Medium, Normal and Low. In addition, it is assumed that data traffic of these levels will occur, over a period of time, in the proportions High (H)—20%, Medium (M)—30%, Normal (N)—30% and Low (L)—20%. These proportions may be varied at will or may be fixed within the scheduling means. The priority selection means to be described handles only the control information associated with data to be transmitted and does not itself handle the data.

Referring now to the drawing, control information relating to data from a source user which is to be transmitted to a destination user is applied to one of a number of buffers 10 to 13. This control information includes a digital representation of the priority given to the associated data by the source user, Each priority level is allocated a separate buffer, here shown as 10 to 13, in the appropriate one of which the control information relating to each particular packet of data is stored. For each of the buffers 10 to 13 an overflow threshold level Td, and an override threshold level Ts is defined, both being between the empty (E) and full (F) levels indicated on the drawing.

A register 14 stores a predefined binary lookup table, having $2^n$ elements, which defines the different levels of priority and their relative proportions suggested above (i.e. each symbol appears in the table in the proportions suggested above), each priority level being represented, for example, by a two-digit binary number, hereinafter referred to as the priority symbol. A random number generator 15, such as a linear feedback shift register, hereinafter called an LFSR, provides at any instant one of $2^n$ binary numbers as an input to the lookup table 14 which results in a priority symbol being generated by the lookup table 14 to an override gating arrangement such as multiplexer 16. This has one input provided when the contents of any one of the registers 10 to 13 reaches the override threshold level Ts, and the input identifies the priority of the queue which has given rise to this input. A further input to multiplexer 16 is provided by a further gating arrangement, such as overflow multiplexer 17. This has two inputs, one of which is the priority symbol output of the lookup table 14. The other input of the multiplexer 17 is provided when the contents of any one of the buffers 10 to 13 reaches the overflow threshold level Td. The multiplexer provides, in the embodiment being described, a statistical 50/50 probability of the priority symbol from the lookup table being changed to that designating the buffer giving rise to the overflow signal. The output from the multiplexer 16 is a two-digit priority symbol which is passed to a selector 18 which determines which of the buffers provides an output to be applied to further sections of the switching apparatus which do not form part of the present invention.

In operation, the control information associated with each packet of data to be applied to the switching apparatus is stored in the appropriate one of the buffers 10 to 13. The LFSR generates a sequence of pseudo-random numbers each of which, in the normal course of events, causes a two-digit priority symbol to be generated by the register 14 and passed to the selector 18 via multiplexers 16 and 17 to select the output of that buffer containing control information of that priority level to be passed to other parts of the switching apparatus.

In the event that one of the buffers 10 to 13 is filled sufficiently to give rise to a Td output, then a signal is applied to the overflow multiplexer 17. This may cause the priority symbol applied to multiplexer 16 to be changed to cause selector 18 to select the output of that buffer giving rise to the overflow signal, in 50% of instances. Thus the priority symbol applied to the selector means 18 from multiplexer 16, and hence the buffer selected to provide an output, may or may not be changed in that particular instance. When the multiplexer does not provide an overflow output, then there is no change to the previously selected priority symbol.

It is convenient to provide a further level of control over the output of the priority selector. In the event that one of the buffers 10 to 13 is filled to the Ts threshold, an override input is applied by that buffer to the multiplexer 16. This forces the priority symbol to be changed to that denoting the buffer giving rise to the signal, so that the next control information to be selected by selector 18 is from that particular buffer.

It will be understood that many of the features of the apparatus described above may be modified. For example, the overflow facility may be omitted so that only override is provided when a buffer is filled to its override threshold level Ts. Alternatively, the chance of an override being applied by multiplexer 16, given above as 50%, may be set at any desired level and may, in practice, be made variable in accordance with the density of traffic received or on other parameters of the traffic flow through the switching apparatus. The number of priority levels and their expected relative proportions may be varied, as has already been stated, and these also may be continuously varied in accordance with traffic patterns. It will be appreciated that the "fairness" of the selection of data of each priority level will be affected both by the position of the threshold levels Ts and Td and by the proportions in which each priority is allocated part of the lookup table.

What is claimed is:

1. A priority selector for data switching apparatus, the priority selector comprising a plurality of buffers operable to receive control information relating to data to be transmitted through the data switching apparatus, each buffer being arranged to store control information having a respective one of a predetermined number of priority levels and each buffer being arranged to deliver an overflow signal when its contents reach a first predetermined level, storage operable to store digital priority symbols representative of the different priority levels denoted by control information received by the buffers, a random number generator operable to generate a succession of numbers each of which selects a corresponding priority symbol from the storage, a gate responsive to the receipt of the overflow signal from any one of the buffers and operable with a predetermined probability of changing the priority symbol generated by the storage to that designating the buffer giving rise to the overflow signal to change the priority symbol generated by the storage, and a selector responsive to the output of the gate to select an output from that buffer designated by that output.

2. A priority selector as claimed in claim 1 in which each buffer has a second predetermined contents level and is operable to generate an override signal when its contents reach this level, and an override control responsive to an override signal and operable to change the priority symbol to that designating the buffer giving rise to the override signal.

3. A priority selector as claimed in claim 1 in which the storage comprises a lookup table.

4. A priority selector as claimed in claim 1 in which the random number generator comprises a linear feedback shift register.

5. A priority selector as claimed in claim 1 in which the probability of a change being produced by the gate can be varied.

6. A priority selector as claimed in claim 5 in which the probability of change is continuously variable in accordance with the rate at which control information is applied to the buffers.

* * * * *